3,329,160
TUBE HANDLING APPARATUS

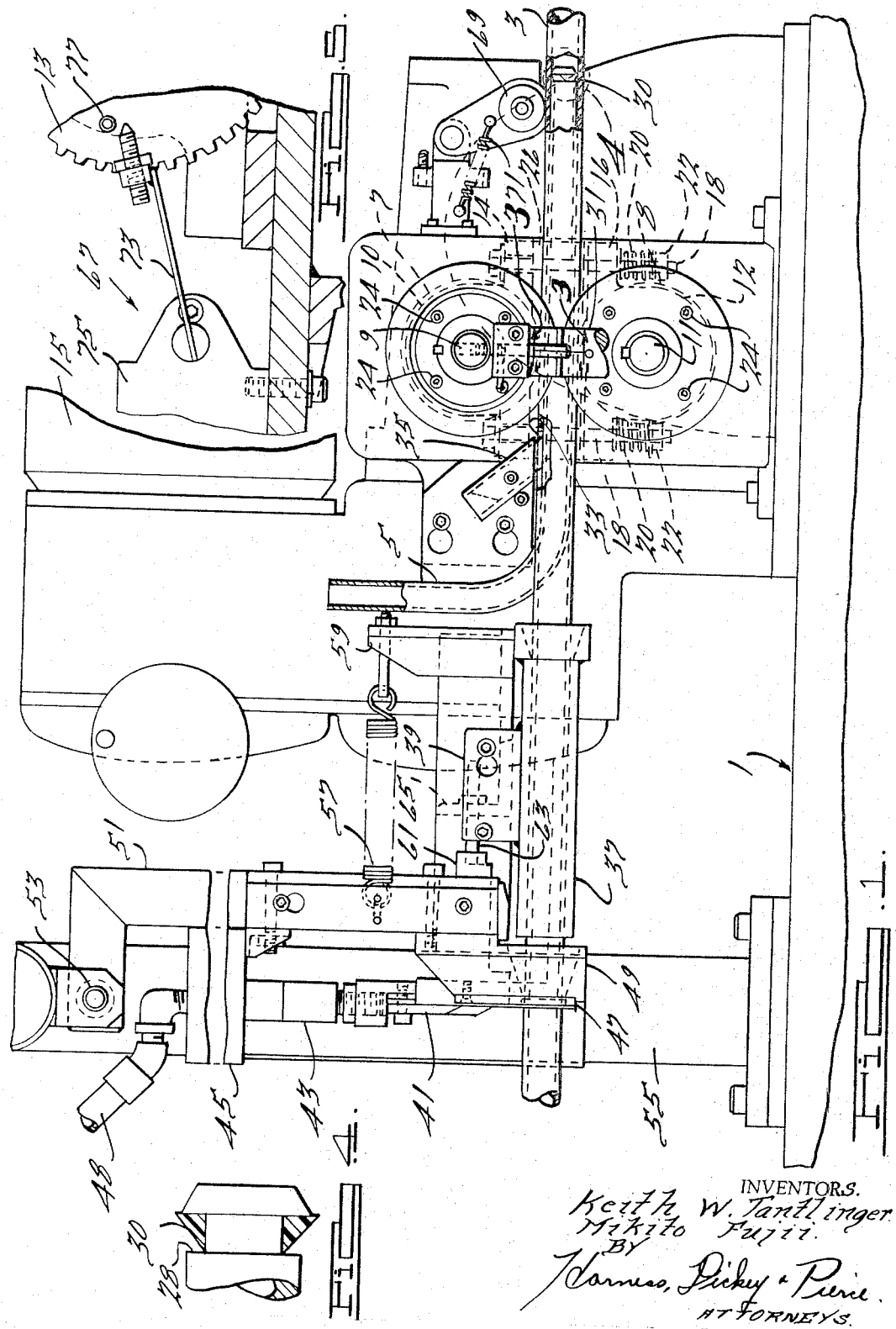

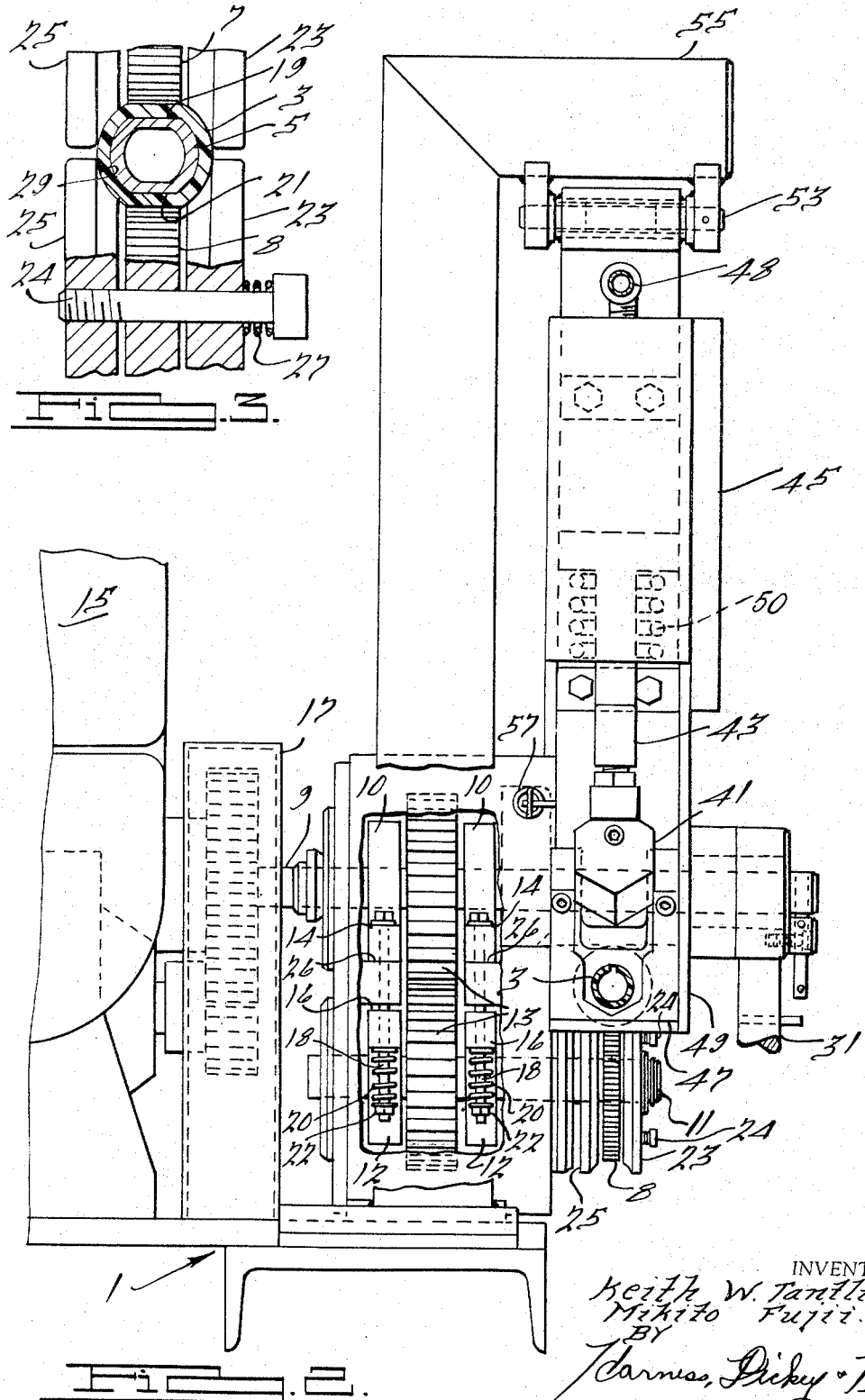

Keith W. Tantlinger, Grosse Pointe Shores, and Mikito Fujii, Warren, Mich., assignors to Fruehauf Corporation, Detroit, Mich., a corporation of Michigan
Filed Mar. 18, 1964, Ser. No. 352,757
6 Claims. (Cl. 137—560)

This invention relates generally to cavity insulating devices and particularly, to a device for handling and disposing of an insulation transmission tube.

In recent years, the foamed-in-place method of insulating cavity structures, such as walls of rail cars, trailer trucks and the like, has gained wide acceptance. Such a method is disclosed in applicant's copending application Ser. No. 184,048, filed Apr. 2, 1962, now Patent No. 3,242,240, for Method of Insulating Cavities. In this method, a plurality of retractable tubes are built into the wall to be insulated upon fabrication thereof so as to extend through the cavities therein. A foam supply nozzle capable of delivering the cellular foam at a controlled volume rate is fitted within a remote end of each of the tubes to inject cellular foam through the tubes and into the cavities while at the same time, the tubes are withdrawn from the cavities at a predetermined rate. Thus, a controlled amount of foam is deposited throughout the particular cavity and when the tubes are completely withdrawn from the cavities, the vehicle walls will have been completely insulated and are ready for use.

One problem area arising in foamed-in-place insulating techniques involves controlling the amount of foam deposited in each portion of the cavity. In order to achieve uniform insulating results, it is necessary to accurately control the rate at which the tubes are withdrawn from the cavity structure. The difficulty in attaining satisfactory results in this area is complicated by variations in tube size and wall thickness as received by the manufacturer.

Another problem area familiar to those skilled in the art of foamed-in-place insulating techniques is that of disposing of the tubes after use without a resulting excessive waste of cellular foam. In applicant's copending application Ser. No. 184,048, now Patent No. 3,242,240, referred to hereinabove, a novel method of handling the tubes and minimizing wastage of the foam substance was disclosed. In that method, the tubes are withdrawn from the cavities being insulated and are passed over the injection nozzle at a predetermined rate. While the tubes are being withdrawn from the cavities, they are split longitudinally at a point rearwardly of the nozzle injection end to facilitate removal of the tubes from the nozzles. In this manner, the length of the tubes containing the foam mix is constantly decreasing until no length of tube contains the foam mix at the termination of injection. Otherwise, if the inner or discharge end of the tubes were merely withdrawn or retracted from the cavities, the entire tube would be filled with foam mix at the termination of injection, resulting in a loss of foam equal to the tube volume.

The present invention deals with an improved positive grip feeding apparatus for withdrawing the insulation transmission tubes of a foamed-in-place insulation assembly and may be used with an injection nozzle assembly. The feeding device is designed to exert a uniform gripping force, and therefore a constant speed feeding force, on the insulation tube during withdrawal notwithstanding tube size or thickness variations. The tubes may thereafter be split longitudinally thereof at a point rearward of the nozzle injection end and, if desired, chopped transversely to facilitate easy handling.

Accordingly, one object of the present invention is to provide an improved apparatus for handling and disposing of cavity insulating tubes.

A further object of the present invention is to provide an improved apparatus for handling and disposing of insulation transmission tubes for the walls of rail or highway vehicles or the like.

A further object of the present invention is to provide an improved apparatus for handling and disposing of foamed-in-place insulation transmission tubes.

A further object of the present invention is to provide an improved tube handling device for retracting the tubes for a foamed-in-place insulation apparatus.

A further object of the present invention is to provide an improved handling device for retractible foamed-in-place insulation transmission tubes which may be operable to transversely chop the tubes during retraction thereof.

A further object of the present invention is to provide an improved tube handling device for retractible foamed-in-place insulation transmission tubes which may be operable to slit the tubes longitudinally during retraction thereof.

A further object of the present invention is to provide an improved tube handling device for retractible foamed-in-place insulation transmission tubes wherein an improved means is provided to insure removal of foam from the tubes.

A further object of the present invention is to provide an improved tube handling for retractible foamed-in-place insulation transmission tubes having a positive grip tube feeding means.

A further object of the present invention is to provide an improved tube feeding device for retractible foamed-in-place insulation transmission tubes operable to compensate for variations in the tube size and thickness.

A further object of the present invention is to provide an improved tube handling device for retractible foamed-in-place insulation transmission apparatus which is relatively inexpensive to manufacture, reliable in operation, and efficient in use.

Other objects and advantages of the present invention will become more apparent from the following detailed description taken in conjunction with the drawings wherein:

FIGURE 1 is an elevational view of a device constructed in accordance with the present invention;

FIG. 2 is an end view of the device of FIG. 1, taken from the left side thereof;

FIG. 3 is an enlarged sectional view of a portion of FIG. 1 taken along lines 3—3 thereof;

FIG. 4 is an enlarged sectional view of a portion of FIG. 1, taken within the area "4" thereof; and FIG. 5 is an enlarged fragmentary view of a typical feed roll control counting device used in conjunction with the device of the present invention.

Referring now to the drawings, a frame, generally indicated at 1, is adapted to be supported, in an appropriate manner, adjacent the cavity structures to be insulated. For example, the copending application Ser. No. 184,048 now Patent No. 3,242,240 hereinabove referred to illustrates how a tube handling assembly may be supported adjacent the walls of a trailer truck to be insulated. A plurality of insulation transmission tubes 3 (only one of which is shown here) made from, for example, plastic, may be of the type which are built into the walls of the cavity to be insulated upon fabrication thereof. Reference may again be had to the copending application hereinabove referred to for illustration of how the insulation transmission tubes 3 are disposed throughout the wall cavities. A nozzle 5 is shown in communication with a foam insulation supply (not shown) and has an end portion adapted to be inserted into a free end portion of a tube 3 when a particular cavity is to be insulated. It is conceivable, however, that the foam could be fed directly to the tube 3 without the use of a nozzle such as 5. The foam may be fed to the nozzle 5 or directly to the tube 3 at a controlled rate from the supply by a controlled, variable speed pump or mixer. Then, as the cellular foam insulation is passed through that particular tube 3, a feeding means will act to withdraw the tube either directly or over the nozzle 5 thus depositing foam to the cavity at a controlled rate and will now be described.

The feed assembly for the tubes 3 is mounted on the frame 1 and is shown to include a pair of wheels 7 and 8 which may be serrated or otherwise roughened and which are mounted in spaced relation to either side of the nozzle 5. The wheels 7 and 8 are fixedly mounted on a pair of shafts 9 and 11, respectively, which are interconnected for synchronous rotary movement by a pair of meshing spur gears 13 fixed thereto. A suitable variable speed electric motor 15, mounted on the frame 1, drives the shaft 9, and therefore the feed wheels 7 and 8 through a suitable gear box 17. Thus, upon actuation of the motor 15, the wheels 7 and 8 will rotate at a predetermined rate clockwise and counterclockwise, respectively, as viewed in FIGURE 1. Thus, by controlling the speed of the motor 15 and the rate of flow of foam to the tube 3 or nozzle 5, a very accurate control of the amount of foam deposited in a particular cavity may be realized.

As shown more clearly in FIGURE 3, the nozzle 5 may be provided with a pair of longitudinally extending flat surfaces 19 and 21 adjacent the feed wheels 7 and 8, respectively, to enhance the feeding movement of the tubes 3 thereover. The nozzle can, however, be formed round and it is only necessary that the feed wheels have flat or cylindrical surfaces to insure proper feeding of the tubes. The tube 3 will therefore be gripped between the serrated surfaces of the wheels 7 and 8 and the flat surfaces 19 and 21, respectively, or, if the nozzle is round, against the curved surfaces, and will be fed longitudinally thereof, the flat surfaces of the wheels acting to give a wider area of direct frictional gripping contact between the wheels and the tube and thus a more positive feeding effect. A pair of guides 23 and 25 are disposed on either side of each of the feed wheels 7 and 8 and are carried by shafts 9 and 11. Each of the guides has an annular groove 29 formed adjacent the outer periphery thereof for receiving, guiding and exerting a squeezing action on a portion of the tube 3. A plurality of bolts 24 freely extend through spaced axial openings formed in each guide 23 and in wheels 7 and 8 and one end of each bolt is threadedly received by the adjacent guide 25. A conventional compression spring 27 may be interposed between the head of each bolt 24 and guide 23. Thus, as tube 3 is drawn by wheels 7 and 8, guides 23 and 25 will be maintained in contact therewith, the springed connection permitting limited flexing of the guides to permit a constant squeezing action on the tube notwithstanding small variations in the tube size or thickness. A hand crank mechanism 31 is appropriately fixed to the shaft 9 to facilitate manually positioning the tube 3 on the nozzle 5 adjacent the wheels 7 and 8 without endangering the hands of the operator.

In the formation of the transmission tubes, quite often there are relatively large variations in both the tube size (OD) as well as the tube wall thickness. Because of the criticality of the rate at which the tubes must be fed and because of the necessity for a constant gripping action between the feed wheels and the tube, it is necessary to compensate for these tube variations. Thus, shafts 9 and 11 are supported by suitable bearings in turn carried by spaced pairs of opposed pillar blocks 10 and 12, respectively. Each pair of pillar blocks is formed with a pair of opposed flanges 14 and 16 through which suitable bolts 18 extend freely as shown in FIGS. 1 and 2. A conventional compression spring 20 is disposed on each of the bolts 18 below the flanges 16 and each spring is retained on its respective bolt by a conventional nut 22. Therefore, as wheels 7 and 8 rotate and feed tube 3 longitudinally, these wheels will be permitted limited movement toward and away from each other to compensate for the variations in the tube size or thickness while maintaining constant the gripping force on the tube and the tube feeding rate without any variation in the rotational speed of the feed wheels. Suitable shims 26 may be interposed between the pillar blocks to limit the movement of wheels 7 and 8 toward each other.

Means may be provided to insure that as the tubes 3 are drawn over the nozzle 5 by the feed wheels 7 and 8, none of the foam is carried with the tubes 3 over the nozzle 5. Thus, the nozzle 5 has formed therein adjacent its end portion, a generally annular groove 28. Positioned within the groove 28 may be a split annular ring 30, of suitable material such as a plastic, having a diameter larger than the nozzle 5 and over which the tubes 3 are drawn. The ring 30 will engage the internal surface of the tubes 3 and will prevent any of the foam from being carried within the tubes 3 over the nozzle 5. Therefore, all of the foam sent through the nozzle 5 will be deposited in the wall cavity to be insulated.

Positioned behind the feed wheels 7 and 8 is a slitting blade 33 fixed to the frame 1 by appropriate means such as a bracket 35. This blade 33 will engage the tube 3 as it is fed in a left-hand direction and will split the end thereof to facilitate its removal from the nozzle 5.

The removed end portion of the tube 3 is then received in a conventional stationary guide means which may be a hollow cylindrical tube 37 fixed to the frame 1 by a bracket 39. Adjacent the exit end of the guide 37 is a chopping means adapted to be periodically operated and effective to reduce the split tube to small disposable pieces.

Thus, the tube chopping means shown herein includes a reciprocating blade 41 which may be fixed to a piston rod 43 of a conventional air motor 45 by appropriate means, and adapted to be moved in face to face cutting relationship with a blade 47 fixed to a bracket 49. The blade 47 and the bracket 49 are formed to receive and support the split tube 3 as it emerges from the guide 37 and when the blade 41 is reciprocated in a downward direction, as viewed in FIGS. 1 and 2 by supplying air through a conduit 48, the portion of the tube 3 extending past the blade 47 will be chopped and may fall into an appropriately disposed waste box. A suitable means such as a spring 50 may be utilized to retract the piston rod 43 and the blade 41 upwardly when the supply of air to the conduit 48 is terminated.

The chopping means, including the blades 41 and 47, the bracket 49 and the motor 45 are all mounted on a sub-frame assembly 51 pivotally attached by a pin or bolt 53 to an arm 55 in turn fixed to the frame 1. A compression spring 57 has one end thereof fixed to the sub-frame 51 while the other end may be adjustably fixed to the frame 1 through an arm 59 integral therewith. A cushion fixed to the frame 1 through a bolt 63 and an angle bracket 65 is positioned for abutment with the sub-frame 51 to limit its movement in a right-hand direction as viewed in FIG. 1. Thus, when the blade 41 is reciprocated into cutting engagement with the blade 47, engagement of the blade 41 by the succeeding portion of the tube 3 will cause movement of the sub-frame 51 in a left-hand direction. In this manner, the feeding movement of the tube 3 by the wheels 7 and 8 will not be impeded. This is important because the rate at which the tube 3 is fed or withdrawn from the cavity being insulated will help determine the amount of insulation deposited therein. When the blade 41 is moved upwardly out of contact with the tube 3, the spring 57 will retract the sub-frame 51 back against the cushion 61 in preparation for the next chopping step.

In the case where the foam is fed directly to tubes 3 and nozzle 5 is eliminated, the tubes are withdrawn directly by feed wheels 7 and 8, the foam under pressure within the tubes serving as the backing against which the tubes are gripped. This would eliminate the need for the slitting blade and the tubes could be either chopped or merely "snaked-back."

Appropriate means may be provided to automatically control the rate at which the foam is delivered to the nozzle 5 or to the tube 3 to maintain a predetermined rate of delivery of foam to the cavity to be insulated. Thus, a control 67 may be driven directly by rotation of shaft 11 upon which the feed roll 8 is mounted while a roller 69 may be spring biased into engagement with the tube 3 by a spring 71. As shown, the control 67 may include a pulse counter 73 pivotally mounted on a switch 75 and adapted to be engaged by one or more actuator pins 77 fixed to one of the gears 13. Thus, as the gears 13 and therefore the feed wheels 7 and 8 rotate thereby causing movement of the tube 3 in a left-hand direction, control pulses from each of the devices 67 and 69 may be fed to a conventional comparator which will maintain the speed of the motor 15 and the rate of flow of foam to the nozzle 5 or tube 3 at a predetermined relationship to deposit the proper amount of foam to the cavity to be insulated. Any slippage of the tube 3 relative to the feed rolls 7 and 8 will be reflected in the comparator, to which the devices 67 and 69 are connected, and a resulting pulse will either vary the speed of the motor 15 or the rate of flow of foam to the nozzle 5 or tube 3.

Thus, it will readily be seen that the device of the present invention will accurately and efficiently handle the foam transmission tubes of a foamed-in-place insulation device. The loss of foam will be kept to an absolute minimum while the used hoses will be disposed of in an efficient and neat manner. As shown, the device of the present invention readily lends itself to accurate and automatic control of the insulating foam delivered to the body being insulated.

While a specific embodiment of the present invention has been illustrated and described herein, it is to be understood that various additions, modifications, substitutions, and omissions may be made without departing from the spirit of the invention as encompassed by the appended claims.

What is claimed is:

1. A tube feeding and cutting device for use with a foamed-in-place insulation device including an elongated injection nozzle, a pair of opposed rotary feed wheels, each having a generally cylindrical portion adjacent said nozzle for engaging a hollow tube positioned on said nozzle and moving it longitudinally thereof, knife means positioned for engagement with said hollow tube, and cutting means for transversely severing said tube subsequent to said slitting operation.

2. A tube feeding and cutting device for use with a foamed-in-place insulation device including an elongated injection nozzle, a pair of opposed rotary feed wheels, each having a serrated generally cylindrical portion adjacent said nozzle for engaging a hollow tube positioned on said nozzle and moving it longitudinally thereof, knife means positioned for engagement with said hollow tube downstream of said feed wheels for longitudinally slitting said hollow tube, and cutting means for transversely severing said tube subsequent to said slitting operation.

3. A tube feeding and cutting device for use with a foamed-in-place insulation device including an elongated injection nozzle, a pair of opposed rotary feed wheels, each having a generally cylindrical portion adjacent said nozzle for engaging a hollow tube positioned on said nozzle and moving it longitudinally thereof, means closely engaging the internal surface of said tube adjacent the injection end of said nozzle, knife means positioned for engagement with said hollow tube downstream of said feed wheels for longitudinally slitting said hollow tube, and cutting means for transversely severing said tube subsequent to said slitting operation.

4. A tube feeding and cutting device for use with a foamed-in-place insulation device including an elongated injection nozzle having a pair of diametrically opposed generally flat surfaces extending longitudinally thereof, a pair of opposed rotary feed wheels, each having a generally cylindrical portion adjacent each said flat surface respectively for engaging a hollow tube positioned on said nozzle and moving it longitudinally thereof, means for controlling the speed of said feed wheels, knife means positioned for engagement with said hollow tube downstream of said feed wheels for longitudinally slitting said hollow tube, and cutting means for transversely severing said tube subsequent to said slitting operation.

5. A tube feeding and cutting device for use with a foamed-in-place insulation device including an elongated injection nozzle, a pair of opposed rotary feed wheels, each having a generally cylindrical portion adjacent said nozzle for engaging a hollow tube positioned on said nozzle and moving it longitudinally thereof, means normally biasing said feed wheels toward each other and said tube, means closely engaging the internal surface of said tube adjacent the injection end of said nozzle, knife means positioned for engagement with said hollow tube downstream of said feed wheels for longitudinally slitting said hollow tube, and cutting means for transversely severing said tube subsequent to said slitting operation.

6. A tube feeding and cutting device for use with a foamed-in-place insulation device including an elongated injection nozzle, a pair of opposed rotary feed wheels, each having a serrated generally cylindrical portion adjacent said nozzle for engaging a hollow tube positioned on said nozzle and moving it longitudinally thereof, a guide positioned on either side of each of said feed wheels, each said guide having an annular groove formed therein adjacent said nozzle, means normally biasing said guides toward said feed wheels, knife means positioned for engagement with said hollow tube downstream of said feed wheels for longitudinally slitting said hollow tube, and cutting means for transversely severing said tubes subsequent to said slitting operation.

References Cited

UNITED STATES PATENTS 2,971,699  2/1961  Reiss _____ 239—186 X
3,172,925  3/1965  Preotle _____ 264—45

WILLIAM F. O'DEA, *Primary Examiner.*

D. R. MATTHEWS, *Assistant Examiner.*